Dec. 5, 1950 W. M. BACKUS, JR., ET AL 2,532,656
HYDRAULIC DAMPER
Filed March 21, 1947
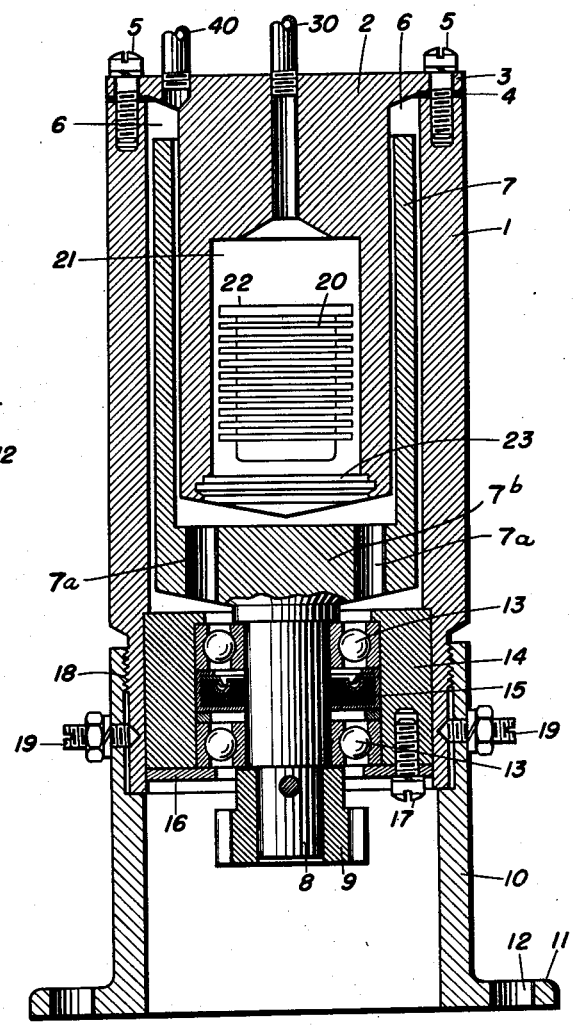
INVENTORS
WALTER M. BACKUS, JR.
CHARLES W. JARVIS.
BY
ATTORNEY Patented Dec. 5, 1950

2,532,656

UNITED STATES PATENT OFFICE 2,532,656

HYDRAULIC DAMPER

Walter M. Backus, Jr., and Charles W. Jarvis, Silver Spring, Md., assignors to the United States of America as represented by the Secretary of the Navy Application March 21, 1947, Serial No. 736,322

1 Claim. (Cl. 188—90)

The present invention relates to dampers filled with a viscous liquid.

The dampers are of the type in which a viscous substance is interposed between two relatively movable elements, whereby a drag is produced whenever relative motion occurs. An efficient form of damper comprises a hollow cylinder constituting one of the elements, located concentrically in a correspondingly shaped, but slightly larger, cavity in the other element, whereby a large surface is exposed to the drag of the viscous material. The object, of course, is to provide a smoothing resistance to motion.

Structure of this sort must be built of several pieces to permit assembly, and consequently joints are present, through which leakage of the material may take place. When the temperature increases, the resulting expansion of the viscous material generates very high pressures, with consequent leakage, and subsequent cooling and contraction then usually allow air to enter. The behavior of the dampers thus becomes erratic.

In order to nullify these undesirable effects of temperature variations, it is proposed to insert within the damper a yieldable means, such as a sealed metallic "Sylphon" bellows containing air or other gas at a suitable pressure. This acts like a gas bubble in permitting compression of its own volume when high pressures are encountered, but automatically expanding again when the pressures decrease. The compressible gas, however, is kept from mixing with the viscous substance by reason of the sealed Sylphon in which it is confined. It is well known that while gases are thus readily "volume-compressible," this is not true of liquids, which decrease in volume only to a negligible extent when pressure is applied to them, so that in the absence of the gas, enormous pressure would be produced by even a small temperature increase of the liquid, and leakage would be almost unavoidable.

While many different embodiments of the invention are possible, a preferred form is chosen for disclosure here, and is shown in the accompanying drawings, wherein:

Fig. 1 is a diagrammatic longitudinal central section through a damper constructed in accordance with the principles of the invention; and Fig. 2 is a fragmentary plan view of the damper.

Referring now to the drawings in detail, the damper comprises an outer stationary cylindrical sleeve 1 with a concentric member 2 therein. A tight joint between these two parts is provided by a flange 3 on the member 2 and a packing gasket 4 between the flange 3 and the end of the sleeve 1; a plurality of screws 5 serving to hold the parts together as shown.

An annular or working space 6 is defined by the inner surface of the sleeve 1 and the outer surface of the depending concentric member 2, and within this space is mounted a hollow cylinder 7, which is rotatable about the axis of its shaft 8. The space 6 is filled with the viscous material heretofore mentioned. Because of the fact that the outer encasement is closed, the viscous filling is confined in a closed system which, therefore, is immune to atmospheric pressure changes. Further, the completely filled system makes immaterial the position into which the damper might be moved because in no case can the viscous filling run out. When the cylinder 7 turns it must overcome the resistance produced by the viscous filling, both on the outer and inner upright surfaces of the cylinder, the double shear thereby involved not only compounding the drag but mainly serving to render it uniform. Bores 7a in the hub 7b of the cylinder provide free communication for the viscous filling between the inside and outside of the cylinder. A pinion 9 or other suitable drive means, pinned to the shaft 8, serves to impart rotation to the shaft 8. The sleeve 1 may be supported in any suitable way, for example, by a base member 10. This is shown as having a flange 11 with a plurality of holes 12 for mounting bolts or screws, which when secured to a support render the outer cylinder static. Ball-bearings 13 support the shaft 8 in a suitable housing 14, and a sealing gasket 15 is provided to prevent leakage of the viscous filling which, permissibly, percolates through the interstices of the upper bearing 13. The bearings 13 and the seal 15 are held in place by a plate 16 and screws 17. The sleeve 1 is shown threaded into the base 10 and 18, and is locked against rotation by two set screws 19.

A "Sylphon" seal 20 is shown as accommodated within a cavity 21 formed in the concentric member 2, herein identified as a static cavity to distinguish the static condition of its filling from the agitatable portion of the filling in the working space 6. This Sylphon is prepared by sealing the open end hermetically by soldering a metal plate 22 into it, while at the same time the air in the Sylphon is kept cool by submerging the lower half of the Sylphon in ice water. The Sylphon chamber 21 has a perforated disk 23 at one end, held in place by a spring-ring.

It will be clear that the Sylphon wall constitutes a yieldable partition or wall that divides the sealed vessel 1 into two portions, one within the Sylphon, filled with air, and the other between the Sylphon wall and the inner surface of the vessel 1, which contains the movable member 7 and the stationary member 2 therein, and contains also the viscous liquid, that completely fills all the remaining space.

Without restricting the invention thereto, it may be stated that the preferred viscous material is that identified as "Polybutene, 8500 MW, can 1256." Other substances studied are the Sperry liquid used in the Eastman dampers, and a heavy liquid known as PD 4247.

What is claimed is:

In a damper, a hermetically sealed vessel having a generally circular-cylindrical bore, a concentric member therein and secured to the vessel, to define a cavity of annular cross section between said bore and the outer surface of said member, a tubular member mounted in said cavity, a shaft extending through one end of the vessel and mounted for rotation, said shaft carrying said tubular member to cause it to turn therewith, within the cavity, about the axis of the vessel, two anti-friction bearings for said shaft, spaced along said shaft, the bearing nearer the cavity being in open communication with said cavity, a sealing gasket between said bearings, a liquid within said cavity, and readily compressible means submerged in said liquid to prevent damage upon expansion of the liquid, said liquid filling all the space within the vessel, within the first named bearing, and up to the gasket, not occupied by said members therein or by the compressible means.

WALTER M. BACKUS, Jr.
CHARLES W. JARVIS.

REFERENCES CITED

The following references are of record in the file of this patent:

UNITED STATES PATENTS

| Number | Name | Date |
|---|---|---|
| 1,238,447 | Severy | Aug. 28, 1917 |
| 2,062,670 | Luebkert | Dec. 1, 1936 |
| 2,167,438 | Kaufman | July 25, 1939 |
| 2,182,076 | Elmer | Dec. 5, 1939 |
| 2,232,252 | Mathey | Feb. 18, 1941 |
| 2,264,111 | Briggs | Nov. 25, 1941 |
| 2,311,930 | Chirelstein | Feb. 23, 1943 |
| 2,314,404 | Katcher | Mar. 23, 1943 |
| 2,417,282 | Wheeler | Mar. 11, 1947 |
| 2,420,360 | Deming | May 13, 1947 |